United States Patent Office 3,006,727
Patented Oct. 31, 1961

3,006,727
PREPARATION OF HYDROGEN FLUORIDE
Robert Palmer Ruh and Ralph Anderson Davis, Midland, Mich., assignors to The Dow Chemical Company, Midland, Mich., a corporation of Delaware
No Drawing. Filed July 3, 1958, Ser. No. 746,335
10 Claims. (Cl. 23—153)

This invention relates to a method for the production of hydrogen fluoride, and is more particularly concerned with a method for the economic recovery of fluorine values as hydrogen fluoride from organic compounds containing fluorine.

Various methods of preparing hydrogen fluoride, including the reaction of calcium fluoride with sulfuric acid at about 300° C., have been proposed. The hydrogen fluoride produced from calcium fluoride is usually contaminated with small quantities of an undesirable impurity, sulfur dioxide. In addition, silicon dioxide which is normally associated with calcium fluoride reacts in the reaction mixture to form silicon tetrafluoride with the concomitant loss of fluorine. Besides the hydrogen fluoride produced, there is also prepared calcium sulfate contaminated with calcium fluoride. This mixture presents a disposal problem, adding to the overall production cost.

A method of preparing fluorocarbons by the porous carbon anode electrolysis of metallic fluorides offers a low cost source of fluorine-containing compounds. While these fluorocarbons have not yet received extensive commercial attention, they do offer a low cost source of fluorine.

Additionally, recovery of fluorine values from various organic compounds has not been practical. In general, where an impure fluorine-containing organic mixture has been provided, this mixture, if not susceptible of separation and purification, has been discarded. Such discarding, of course, results in the irretrievable loss of the fluorine values. The process of the present invention provides a method of recovering such fluorine values, as hydrogen fluoride, in a highly usable form.

Specifically, the process of the present invention comprises passing a relatively anhydrous mixture of fluorine-containing organic compounds and hydrogen over an activated carbon catalyst at a temperature of at least 500° C. and for a contact time of at least one second. There is thus produced in a gaseous reaction product substantial quantities of hydrogen fluoride gas containing substantially none of the impurities now present in commercially produced hydrogen fluoride. The impurities that are produced are easily separated by conventional separation techniques. Because of the relatively high temperatures employed, the reactivity of the hydrogen and the various intermediate reaction products, it is desirous that substantially anhydrous conditions be maintained in the reaction zone, else substantial corrosion of the reaction vessels and reduced yields of hydrogen fluoride results. While a temperature of about 500° C. is operative, and a maximum temperature obtainable in a particular reactor used constitutes a maximum temperature, preferably, temperatures in the range between 700 and 1200° C., and preferably from 800 to 1100° C. are usually employed. At the lower temperatures, a reduced rate of reaction occurs, whereas, at the higher temperatures, a relatively rapid rate of reaction occurs. Therefore, a contact time of from 1 to 100 seconds is contemplated, contact times from 2.5 to 50 seconds being preferred. Specific contact times will be dependent on the particular temperature and reactants employed. While the mole ratio of the reactants is not critical, it is preferable that a theoretical excess of hydrogen required to react with all the fluorine be introduced into the reactor in order that substantially all of the fluorine contained in the fluorine-containing organic compound may be converted to hydrogen fluoride.

The catalyst employed may be either an activated charcoal or an activated charcoal promoted by any of the active metals, such as, for example, palladium, platinum, iron, cobalt, nickel, copper, chromium, vanadium, etc. These materials are usually deposited on the charcoal as an aqueous chloride solution and thereafter dried and the chloride reduced by passing hydrogen thereover at elevated temperatures above about 200° C. and preferably about 300° C. The presence of an active metal on an activated charcoal tends to reduce the temperature required to achieve a predetermined reaction rate. However, the presence of a metal is not required to achieve the overall reaction of the present invention.

While the use of carbon tetrafluoride is preferred as starting material for the process of the present invention for certain economic reasons, other fluorocarbons such as perfluoroethane, perfluoroethene, perfluoropropane, perfluoropropene, perfluorobutane, perfluorobutenes, perfluoropentane, etc. may be employed. A factor governing choice will depend upon the availability of the particular fluorocarbon. Mixtures of fluorocarbons are also within the scope of the present invention. Additionally, other fluorine-containing organic compounds may be employed as starting materials, such as, for example, $CBrClF_2$, $CBrF_3$, $CBr_2ClF$, $CBr_2F_2$, $CBr_3F$, $CClF_3$,
$CCl_2FI$, $CCl_2F_2$, $CCl_3F$, $CF_3I$, $CHBrFI$, $CHBrF_2$,
$CHBr_2F$, $CHClF_2$, $CHCl_2F$, $CHFI_2$, $CHF_2I$, $CHF_3$,
$CH_2BrF$, $CH_2ClF$, $CH_2FI$, $CH_2F_2$, $CH_3F$, $CF_2BrCFClI$
$CF_2ClCFClBr$, $C_2F_5Br$, $CF_2BrCFClBr$, $CF_2BrCCl_2Br$,
$CFClBrCFClBr$, $CFClBrCCl_2Br$, $CF_2BrCF_2Br$, $CF_3CBr_3$
$CF_3CFCl_2$, $CF_3CCl_3$, $CF_2ClCFCl_2$, $CFCl_2CFCl_2$,
$C_3Cl_5F$, $C_2F_5I$, $CF_2BrCHBrCl$, $CFBr_2CHBr_2$,
$CFCl_2CFHCl$, $CFCl_2CHCl_2$, $CF_3CHI_2$, $CF_3CH_2Br$,
$CF_3CH_2Cl$, $CF_2ClCH_2Cl$, $CF_2HCHCl_2$, $CFHClCHCl_2$,
$CF_3CH_2F$, $CHBrFCH_2Br$, $CF_2HCH_2Cl$, $CHF_2CH_2F$,
$CH_2FCH_2F$, $CF_3(CF_2)_2Br$, $CF_3CFBrCF_2Br$,
$C_2F_5CF_2Cl$, $(CF_3)_2CFCl$, $Cl(CF_2)_3CFCl$, $Cl(CF_2)_3Cl$,
$CF_3CCl_2CF_2Cl$, $CF_3CFClCCl_3$, $CF_2ClCF_2CCl_3$,
$CF_2ClCCl_2CF_2Cl$, $CF_3C_2Cl_5$, $C_2Cl_5CF_2Cl$, $CF_3CF_2CF_3$,
$CF_3CHClCF_2Cl$, $CF_2ClCF_2CHCl_2$, $CF_3CCl_2CHCl_2$,
$CF_2ClCFClCHCl_2$, $CF_2ClCCl_2CHCl_2$, $CFCl_2CHClCCl_2F$,
$F(CF_2)_3H$, $C_2F_5CH_2Cl$, $CF_3CHBrCH_2Br$,
$CH_3CF_2CFCl_2$, $CH_3CFClCF_2Cl$, $CF_3CHBrCH_3$,
$CF_3(CH_2)_2Cl$, $CF_3CHClCH_3$, $CF_3(CH_2)_2I$,
$CF_3C_2H_5$, $F(CF_2)_4Br$, $(CF_2BrCFCl-)_2$,
$CF_3CBrFCBrFCF_3$, $F(CF_2)_4Cl$, $CF_3(CF_2)_2CCl_3$,
$F(CF_2)_4Cl$, $CF_3(CF_2)_2CCl_3$, $CF_3(CF_2)_2CF_3$,
$CF_3CHClCCl_2CF_3$, $CF_3(CHCl)_2CF_3$, $C_2F_5CH_2CF_3$,
$CF_3CCl(CH_3)CF_2Cl$, $CF_3(CH_2)_2CF_3$,
$CF_3CH_2CF_2CH_3$, $CF_3(CH_2)_3I$, $CH_3(CH_2)_3F$,
$CFClBrCF_2CFClCF_2CCl_3$, $CF_3(CF_2)_4Cl$,
$CF_3(CF_2)_3CF_3$, $CF_3(CF_2)_4CF_3$, $CF_3(CF_2)_3CF_2H$,
$CF_3CF(CH_2)CF_2CF_2H$, $(CH_2F)_4C$, $CF_3(CF_2)_4CF_2Br$,
$CF_3(CF_2)_4CF_2Cl$, $CF_3(CF_2)_5CF_3$, $CF_3(CF_2)_5CF_2H$,
$CF_3(CF_2)_7CF_3$, $CF_2Cl(CF_2)_{10}CF_2H$,
$CH_3(CH_2)_3(CF_2)_8H$, $CF_2Cl(CFClCF_2)_6CFCl_2$,
$CF_3(CF_2)_{12}CF_2I$, $CF_3(CF_2)_{14}CF_2I$,
$CF_3(CF_2)_{14}CF_3$,

 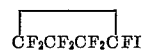 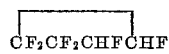

$CF_2$=$CFCF_2Br$, $CCl_2$=$CClCF_3$, $CF_2$=$CFCF_3$,
$CF_2$=$CHCF_3$, $CF_2$=$CFCF_2CF_3$, $CF_3CF_2CClFCF=CClF$, $CF_3(CF_2)_2CH=CH_2$,
$CF_3(CF_2)_2CFHCF_2CH=CH_2$, $CF_3(CF_2)_6CF=CF_2$,
$CFCl=CFCF=CFCF=CFCl$,
$CF_2=CFCF_2CF=CFCF_2CF=CF_2$,
$(CF_2=CFCF_2CFClCF_2CF=)_2$, $CF_3C≡CCH_3$,
$CF_3C≡CH$, $\overline{CF_2CFBrCFBrCF_2CF=CF}$   $\overline{CF_2CF_2CF(CF_3)CF_2CF=CFCF=CF}$ $CF_3(CF_2)_2CH_2OH$, $CF_3OF$,
$CF_3(CF_2)_2CH(OH)CF_3$, $CF_3(CF_2)_2CH(OH)CF_2CF_3$,
$CF_3(CF_2)_2CH(OH)-(CH_2)_2CH_3$,
$(CF_3CF_2CF_2)_2C(CF_2CF_3)OH$, $CF_3(CF_2)_{10}CH_2OH$,
$CHF_2(CF_2)_{23}CH_2OH$, $HOCH_2(CF_2)_3CH_2OH$,
$CF_3(CF_2)_2CH(OH)CH_2CH_2OH$,
$[CF_2CF_2C(CH_3)_2OH]_2$,
$CH_3(CH_2)_2CH(OH)(CH_2)_4CH=CHCH_2CH_3$,
$C_2F_5OC_2F_5$, $CF_2HCF_2OC_2H_5$,
$CF_3CF_2CH_2OCH_2CH_2Cl$, $CF_3CHFCF_2OC_2H_5$,
$CF_3(CF_2)_2O(CF_2)_2CF_3$, $CF_3(CF_2)_3O(CF_2)_3CF_3$, $\overline{CF_2HCF_2OCH(CH_2)_4CH_3}$ $CF_3CH_2OCH=CH_2$, $\overline{CF_2CF_2CF_2C(OCH_3)=CCl}$ $CF_3(CF_2)_2(CH_2)CH=CH_2$, $\overline{CF_3CClCF_2CF_2CCl_2O}$ $CF_3CHFCH_2OCH_2CH_2OH$, $CF_3COCF_3$,
$CF_3COCHF_2$, $CF_3COCH_3$, $\overline{CF_2CF_2CF_2CF_2CO}$ $CF_3CF_2CF_2COCH_3$, $CF_3CF_2CF_2OCF_2CF_3$,
$CF_3(CF_2)_3COCH_2COCH_3$, $CF_3CF_2CF_2COCH_2COCH_3$,
$CF_3CHO$, $CF_3CH_2CHO$, $CF_3CH=CHCHO$,
$CF_3(CF_2)_3CHO$, $CF_3(CF_2)_6CHO$,
$C_2F_5CH(OH)OC_2H_5$, $CF_3CF_2CF_2CH(OH)OCH_2CH_3$,
$CF_3CF_2CF_2CH(OH)_2$, $CF_3COCF_2CO_2H$,
$CF_3CHFCF_2CO_2H$, $C_3(CF_2)_3CO_2H$,
$CF_3(CF_2)_4CO_2H$, $CF_3(CF_2)_2CHFCF_2CO_2H$, $\overline{CF_2(CF_2)_4CFCF_2CO_2H}$ $CF_3(CH_2)_8CO_2H$, $H(CF_2CF_2)_5CO_2H$,
$CF_3(CF_2)_{12}CO_2H$, $CF_2(CO_2H)_2$, $(-CF_2CO_2H)_2$,
$(-CFClCF_2ClOH)_2$, $HO_2CCF_2CFH(CF_2)_2CO_2H$,
$HO_2CCF_2CF(CF_3)(CF_2)_2CO_2H$, $CF_3COF$,
$CF_3COI$, $C_2F_5COCl$, $CF_3CF_2COF$, $CF_3(CF_2)_2COI$, $CF_3(CF_2)_3COCl$,
$CF_3(CF_2)_2CH=CHCOCl$,
$CF_3(CF_2)_2CH_2O_2C(CF_2)_3COCl$,
$(CF_3CO)_2O$, $CF_3CHFCO_2C_2H_5$, $CF_3C(OCH_3)_3$,
$C_2F_5CO_2CH(CH_3)_2$, $C_2F_5C(OCH_3)_3$,
$CF_3(CF_2)_3CO_2C_2H_5$, $CF_3(CF_2)_2C(OCH_3)_3$,
$CF_3(CF_2)_2CO_2CH_2CO_2C_2H_5$,
$CF_3(CH_2)_2CO_2(CH_2)_4CH_3$,
$CF_3(CF_2)_8CO_2CH_3$, $CH_3CO_2CH_2(CF_2)_8CF_3$,
$[(CF_3)(CF_2)_2CO_2(CH_2)_3]_2$, $[(CF_2)_2CO_2(CH_2)_3CH_3]_2$,
$[(CH_2)_2CO_2CH_2(CF_2)_3CF_2H]_2$,
$[CF_3(CF_2)_2CO_2(CH_2)_5]_2$,
$[CF_2H(CF_2)_5CO_2(CH_2)_3]_2$,
$CF_3(CF_2)_3CO_2CH=CH_2$, $CF_3(CF_2)_8CO_2CH=CH_2$,
$CH_2=CHCO_2CH_2(CF_2)_8CF_3$,
$(CH_2=CHCO_2)_2CH(CF_2)_2CF_3$,
$CH_3(CH_2)_2CO_2CH_2(CF_2)_4CH_2OH$,
$CF_3(CF_2)_6CHOHCHFCO_2C_2H_5$,
$CF_3(CF_2)_6CHOHCH_2CO_2C_2H_5$,
$CF_3CF_2CONH_2$, $CF_3(CF_2)_2CONH_2$,
$CCl_3(CF_2)_3CONH_2$, $CF_3(CF_2)_2CONHCH_2CH_2OH$,
$CF_3(CF_2)_6CONH_2$, $CHF_2(CF_2)_7CONH_2$,
$(CF_2CF_2CH_2NHCOCH_3)_2$, $CF_3CONHBr$,
$CF_3CF_2C(NH_2)=NH$, $CF_3(CF_2)_8C(NH_2)=NH$,
$[CF_3(CF_2)_8CH_2NH]_2CO$, $CF_3CN$,
$(CF_2)_4(CN)_2$, $CF_3(CF_2)_2CH_2NCO$,
$CF_3(CF_2)_7NCO$, $CF_3(CH_2)_4SCN$,
$CF_3(CF_2)_2CO(SCN)$, $CF_3NF_2$, $(CF_3)_3N$,
$(CF_3)_2NC_2F_5$, $CF_3N=CF_2$, etc.

The hydrogen fluoride thus-produced may be readily separated from the gaseous products by condensation, dissolving in water, etc. in a conventional manner. The by-products of the reaction, such as carbon, methane, ethane, and other hydrocarbons or organic materials may be readily disposed by burning or collected.

The following examples are given to illustrate the process of the present invention but are not to be construed as limiting the invention thereto.

*Example*

A heated nickel reactor containing a catalyst bed was provided and dry hydrogen mixed with a dry fluorine-containing organic gas passed through this reactor. The gaseous reaction products were passed through a water trap and thereafter analyzed. In runs No. 1, 2 and 3, a gaseous mixture containing substantially only carbon tetrafluoride was employed, while in runs 4, 5 and 6, a mixture containing predominantly hexafluoroethane was employed.

The results of various runs are summarized on the following table:

REDUCTION OF $CF_4$ TO HF

| Run No. | Catalyst | Furnace Temperature, °C. | Appx. $H_2$/Org. Mole Ratio | Appx. Contact Time, sec. | Moles $H_2$ Fed | Moles $CF_4$ Fed | Moles HF Titrated | Conversion to HF, percent | Percent $CF_4$ in Residue |
|---|---|---|---|---|---|---|---|---|---|
| 1a | I | 850–900 | 2.6/1 | 3 | 1.0 | 0.385 | 0.7 | 45 | 6.8 |
| 1b | I | 850–900 | 7/1 | 15 | 0.74 | 0.11 | 0.44 | 100 | 0.06 |
| 2 | III | 1,000–1,100 | 18/1 | 20 | 0.54 | 0.03 | 0.12 | 100 | 0.0 |
| 3 | IV | 950–1,000 | 12/1 | 50 | 0.54 | 0.046 | 0.184 | 100 | 0.0 |

REDUCTION OF $C_2F_6$ TO HF

| Run No. | Catalyst | Furnace Temperature, °C. | Appx. $H_2$/Org. Mole Ratio | Appx. Contact Time, sec. | Moles $H_2$ Fed | Moles $C_2F_6$ Fed | Moles HF Titrated | Conversion to HF, percent | Percent $CF_4$ in Residue |
|---|---|---|---|---|---|---|---|---|---|
| 4 | V | 850 | 8/1 | 44 | 0.54 | 0.067 | 0.044 | 11 | 32 |
| 5 | VI | 750–850 | 8/1 | 40 | 0.54 | 0.067 | 0.39 | 97 | 0.0 |
| 6 | VII | 750–850 | 10/1 | 40 | 0.61 | 0.06 | 0.354 | 98 | 0.0 |

I. Pd on 10–16 mesh active carbon (30 cc. bed) 300 cc. of active charcoal were impregnated with 10 gms. $PdCl_2·2H_2O$ in diluted HCl. Catalyst reduced at 300° C. until no more HCl was released.
III. 16 mesh activated carbon (174 cc.).
IV. 5% $FeCl_3$ on 16 mesh activated charcoal (174 cc.). Reduced at 350° C. for 4 hours before use.
V. Reduced $PdCl_2$ on $CaF_2$ pellets (175 cc.).
VI. Pd on 10–16 mesh activated charcoal (200 cc.) prepared as in I and in Ia and Ib.
VII. 10–16 mesh activated charcoal.

By treating starting materials other than fluorocarbons, i.e., organic compounds containing fluorine, in a manner similar to that of the foregoing examples, hydrogen fluoride may be produced. The following table summarizes the results obtained with selected and representative fluorine-containing organic compounds.

REDUCTION OF FLUOROHALOCARBON COMPOUNDS

| Run No. | Catalyst | Material Received | Furnace Temp., °C | $H_2$/Org. Mole Ratio | Approx. Contact Time, sec. | Percent of Halogen Acid Recovered |
|---|---|---|---|---|---|---|
| 7 | Same as III, 210 cc. | $CHClF_2$ | 900 | 5/1 | 77 | 82 |
| 8 | do | $CBrClF_2$ | 900 | 5.3/1 | 14 | 97 |
| 9 | do | $C_6H_5CF_3$ | 900 | 3/1 | 12 | 86 |
| 10 | do | $C_4Cl_6F_4$ | 900 | 12 | | 81 |
| 11 | do | $CF_3COOH$ | 900 | 4.5 | 9 | 87 |
| 12 | do | $C_6H_5F$ | 900 | 4 | | 84 |
| 13 | do | $CH_2ClOCF_2-CFClH$ | 900 | 12 | | 86 |
| 14 | do | $CF_2=CClF$ | 900 | 4/1 | 9 | 93 |

In each of the above examples the presence of substantial amounts of hydrogenfluoride was confirmed by analysis of the halogen acid.

In a manner similar to that of the foregoing examples, each of the hereinbefore listed fluorine-containing organic compounds may be substituted for the specific materials used in the examples.

Various modifications may be made in the present invention without departing from the spirit and scope thereof, and it is to be understood that we limit ourselves only as defined in the appended claims.

We claim:
1. A process for the preparation of hydrogen fluoride which comprises: passing a mixture of an excess of hydrogen and a fluorine-containing organic compound over activated carbon maintained at a temperature of at least 500 degrees centigrade, and, separating hydrogen fluoride from the resulting mixture.

2. A process for the preparation of hydrogen fluoride which comprises: contacting, for a contact time of from 1 to 100 seconds, a mixture of an excess of hydrogen and a fluorine-containing organic compound with an activated carbon catalyst maintained at a temperature of at least 500 degrees centigrade, and, separating hydrogen fluoride from the reaction mixture.

3. A process for the preparation of hydrogen fluoride which comprises: contacting, for a contact time of from 1 to 100 seconds, a mixture of an excess of hydrogen and a fluorine-containing organic compound, with an activated carbon catalyst maintained at a temperature from 700 to 1200 degrees centigrade, and separating hydrogen fluoride from the reaction mixture.

4. A process for the preparation of hydrogen fluoride which comprises: passing a mixture of an excess of hydrogen and a fluorine-containing organic compound over an activated carbon promoted by an active metal catalyst and maintained at a temperature of at least 500 degrees centigrade, and, separating hydrogen fluoride from the resulting mixture.

5. A process for the preparation of hydrogen fluoride which comprises: contacting, for a contact time of from 1 to 100 seconds, a mixture of an excess of hydrogen and a fluorine-containing organic compound, with an activated carbon promoted by an active metal catalyst and maintained at a temperature of at least 500 degrees centigrade, and, separating hydrogen fluoride from the reaction mixture.

6. A process for the preparation of hydrogen fluoride which comprises: contacting, for a contact time of from 1 to 100 seconds, a mixture of an excess of hydrogen and a fluorine-containing organic compound, with an activated carbon promoted by an active metal catalyst and maintained at a temperature from 700 to 1200 degrees centigrade, and separating hydrogen fluoride from the reaction mixture.

7. A process for the preparation of hydrogen fluoride which comprises: passing a mixture of hydrogen and carbon tetrafluoride gas over activated carbon maintained at a temperature of at least 500 degrees centigrade, and, separating hydrogen fluoride from the resulting mixture.

8. A process for the preparation of hydrogen fluoride which comprises: contacting, for a contact time of from 1 to 100 seconds, a mixture of hydrogen and carbon tetrafluoride gas, with an activated carbon catalyst maintained at a temperature from 800 to 1100 degrees centigrade, and, separating hydrogen fluoride from the reaction mixture.

9. A process for the preparation of hydrogen fluoride which comprises: passing a mixture of hydrogen and hexafluoroethane gas over activated carbon maintained at a temperature of at least 500 degrees centigrade, and, separating hydrogen fluoride from the resulting mixture.

10. A process for the preparation of hydrogen fluoride which comprises: contacting, for a contact time of from 1 to 100 seconds, a mixture of hydrogen and hexafluoroethane gas, with an activated carbon catalyst maintained at a temperature from 800 to 1100 degrees centigrade, and, separating hydrogen fluoride from the reaction mixture.

References Cited in the file of this patent

UNITED STATES PATENTS

| 2,477,038 | Bloch | July 26, 1948 |
| 2,481,207 | Eberle | Sept. 6, 1949 |
| 2,494,867 | Frey | Jan. 17, 1950 |
| 2,802,887 | Miller et al. | Aug. 13, 1957 |

FOREIGN PATENTS

| 445,288 | Great Britain | Oct. 3, 1935 |

OTHER REFERENCES

Degering, Nelson, Harrod book: "An Outline of Organic Chemistry," revised ed. (1937), page 94, Barnes and Noble, Inc., N.Y.

Simons book: "Flourine Chemistry," vol. 2, 1954 ed., pp. 276, 285, 293, Academic Press Inc., N.Y.

UNITED STATES PATENT OFFICE
CERTIFICATE OF CORRECTION

Patent No. 3,006,727                          October 31, 1961

Robert Palmer Ruh et al.

It is hereby certified that error appears in the above numbered patent requiring correction and that the said Letters Patent should read as corrected below.

Column 2, lines 65 and 66, the right-hand formula should appear as shown below instead of as in the patent:

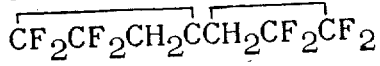

column 4, line 31, after "gaseous" insert -- reaction --; columns 3 and 4, in the title of the table, for "CR$_4$" read -- CF$_4$ --; same table, under the heading Percent CF$_4$ in Residue and opposite Run No. 1a, for "6.8" read -- 46.8 --.

Signed and sealed this 24th day of April 1962.

(SEAL)
Attest:

ESTON G. JOHNSON
Attesting Officer

DAVID L. LADD
Commissioner of Patents